United States Patent
Elms et al.

(12) 
(10) Patent No.: US 6,512,015 B1
(45) Date of Patent: Jan. 28, 2003

(54) SILICONE FOAM CONTROL COMPOSITIONS

(75) Inventors: Russell Allen Elms, Midland, MI (US); Margaret Ann Servinski, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 51 days.

(21) Appl. No.: 09/607,479

(22) Filed: Jun. 30, 2000

(51) Int. Cl.$^7$ .............................. B01D 19/04; C08K 5/01
(52) U.S. Cl. ...................... 516/118; 516/117; 524/588
(58) Field of Search ................. 516/117, 118; 524/588

(56) References Cited

U.S. PATENT DOCUMENTS

| | | | |
|---|---|---|---|
| 2,676,182 A | 4/1954 | Daudt et al. ................. | 556/453 |
| 3,784,479 A | 1/1974 | Keil ............................ | 516/118 |
| 4,639,489 A | 1/1987 | Aizawa et al. ............... | 524/588 |
| 4,749,740 A | 6/1988 | Aizawa et al. ............... | 524/588 |
| 4,853,474 A | 8/1989 | Bahr et al. ................... | 556/445 |
| 5,136,068 A | 8/1992 | Bahr et al. ................... | 556/445 |
| 5,283,004 A | 2/1994 | Miura ......................... | 516/117 |
| 5,380,464 A | 1/1995 | McGee et al. ............... | 516/118 |
| 5,543,082 A | 8/1996 | McGee et al. ............... | 516/118 |
| 5,777,059 A * | 7/1998 | Datz-Siegel et al. ......... | 524/588 |
| 5,908,891 A | 6/1999 | Fey et al. ...................... | 516/11 |
| 5,914,362 A * | 6/1999 | Brecht et al. ................ | 524/588 |
| 6,075,087 A * | 6/2000 | Juen et al. ................... | 524/588 |
| 6,207,722 B1 * | 3/2001 | Juen et al. ................... | 516/123 |

FOREIGN PATENT DOCUMENTS

| | | | |
|---|---|---|---|
| EP | 0217501 | 4/1987 | ........... B01D/19/04 |
| EP | 0638346 | 2/1995 | ........... B01D/19/04 |
| EP | 0663225 | 7/1995 | ........... B01D/19/04 |
| EP | 0774503 | 5/1997 | |
| EP | 0913 181 A * | 5/1999 | |

* cited by examiner

*Primary Examiner*—Daniel S. Metzmaier
(74) *Attorney, Agent, or Firm*—Timothy J. Troy

(57) ABSTRACT

This invention relates to silicone foam control compositions comprising a silicone antifoam agent, mineral oil, a polydiorganosiloxane containing at least one polyoxyalkylene group, and a finely divided filler. The foam control compositions of this invention can be advantageously utilized to control foam in foam producing systems, provide improvement in the control of foaming behavior, and are stable and easily dispersible.

25 Claims, No Drawings

SILICONE FOAM CONTROL COMPOSITIONS

FIELD OF THE INVENTION

This invention relates to silicone foam control compositions. More particularly, this invention relates to silicone foam control compositions comprising a silicone antifoam agent, mineral oil, a polydiorganosiloxane containing at least one polyoxyalkylene group, and a finely divided filler.

BACKGROUND OF THE INVENTION

The use of various silicone containing compositions as antifoams or defoamers is known. In this regard, it is well established that this art is highly unpredictable and slight modification can greatly alter performance of such compositions. Most of these compositions contain silicone fluid (usually dimethylpolysiloxane), often in combination with small amounts of silica filler. Additionally, these compositions may include various surfactants and dispersing agents in order to impart improved foam control or stability properties to the compositions.

Silicone compositions which are useful as foam control agents have been taught in the art. For example, Aizawa et al., in U.S. Pat. Nos. 4,639,489 and 4,749,740, the disclosures of which are hereby incorporated by reference, teach a method for producing a silicone defoamer composition wherein a complex mixture of polyorganosiloxanes, filler, a resinous siloxane and a catalyst to promote reaction of the other components are heated together at 50° C. to 300° C.

More recently, a method for preparing a composition similar to that described by Aizawa et al., cited supra, was disclosed by Miura in U.S. Pat. No. 5,283,004, the disclosure of which is hereby incorporated by reference. In this disclosure, the above mentioned complex silicone mixture additionally contains at least 0.2 weight parts of an organic compound having at least one group selected from —COR, —COOR' or —(OR")$_n$—, wherein R and R' are hydrogen or a monovalent hydrocarbon group, R" is a divalent hydrocarbon group having 2 to 6 carbon atoms and the average value of n is greater than one. It is further disclosed that all the ingredients, including a catalyst, must be reacted at elevated temperatures to obtain the desired antifoam agent.

John et al., in European Patent Application No. 217,501, published Apr. 8, 1987, discloses a foam control composition which gives improved performance in high foaming detergent compositions which comprises (A) a liquid siloxane having a viscosity at 25° C. of at least 7×10$^{-3}$ m$^2$/s and which was obtained by mixing and heating a triorganosiloxane-endblocked polydiorganosiloxane, a polydiorganosiloxane having at least one terminal silanol group and an organosiloxane resin, comprising monovalent and tetravalent siloxy units and having at least one silanol group per molecule, and (B) a finely divided filler having its surface made hydrophobic. John et al. further describes a method for making the foam control compositions and detergent compositions containing said foam control compositions.

McGee et al. in U.S. Pat. No. 5,380,464 discloses a foam control composition comprising a silicone defoamer reaction product and a silicone glycol copolymer which is particularly effective in defoaming highly acidic or highly basic aqueous systems. However, when a foam control composition comprising a silicone antifoam agent and a silicone glycol copolymer is employed, it is added in the form of a liquid or after dilution with water to a foamable liquid thus requiring higher levels of the silicone copolymer.

McGee et al. in U.S. Pat. No. 5,543,082 discloses a foam control composition prepared by mixing at room temperature a silicone defoamer reaction product, a silicone glycol copolymer, and a hydroxyl-endblocked polydiorganosiloxane polymer.

In European Patent Application No. 0638346 is disclosed a composition comprising a reaction product, a nonaqueous liquid continuous phase, and a moderately hydrophobic particulate stabilizing aid. EP'346 discloses that the reaction product is prepared by heating a mixture of a polyorganosiloxane fluid, a silicon compound, a finely divided filler, and a catalytic amount of a compound for promoting the reaction of the other components at a temperature of 50° C. to 300° C. EP'346 further discloses that these compositions can further contain at least one nonionic silicone surfactant, and a nonreinforcing inorganic filler.

In European Patent Application No. 0663225 is disclosed a foam control composition comprising a silicone antifoam agent and a crosslinked organopolysiloxane polymer having at least one polyoxyalkylene group.

Fey et al. in U.S. Pat. No. 5,908,891 discloses a dispersible silicone composition comprising (I) a silicone composition prepared by reacting a polyorganosiloxane, a silicon compound, optionally a finely divided filler, and a catalytic amount of a compound for promoting the reaction of the other components and (II) mineral oil. Fey et al. further discloses that the mineral oil is effective as a dispersing agent for the silicone composition (I).

SUMMARY OF THE INVENTION

This invention relates to silicone foam control compositions. More particularly, this invention relates to silicone foam control compositions comprising a silicone antifoam agent, mineral oil, a polydiorganosiloxane containing at least one polyoxyalkylene group, and a finely divided filler.

It is an object of the present invention to prepare silicone compositions which can be advantageously utilized to control foam in foam producing systems.

It is a further object of the present invention to provide silicone compositions wherein there is provided improvement in the control of foaming behavior.

It is a further object of the present invention to provide silicone foam control compositions which are stable and easily dispersible.

DETAILED DESCRIPTION OF THE INVENTION

The present invention relates to a silicone foam control composition comprising (I) a silicone antifoam agent prepared by reacting at a temperature of 50° C. to 300° C. a mixture comprising: (i) 100 weight parts of at least one polyorganosiloxane selected from the group consisting of (A) a polyorganosiloxane having a viscosity of about 20 to 100,000 mm$^2$/s at 25° C. and being expressed by the general formula R$^1_a$SiO$_{(4-a)/2}$ in which R$^1$ is a monovalent hydrocarbon or halogenated hydrocarbon group having 1 to 10 carbon atoms and a has an average value of 1.9 to 2.2, (B) a polyorganosiloxane having a viscosity of 200 to about 100 million mm$^2$/s at 25° C. expressed by the general formula R$^2_b$(R$^3$O)$_c$SiO$_{(4-b-c)/2}$ in which R$^2$ is a monovalent hydrocarbon or halogenated hydrocarbon group having 1 to 10 carbon atoms, R$^3$ is hydrogen or a monovalent hydrocarbon group having 1 to 10 carbon atoms, b has an average value of 1.9 to 2.2 and c has a sufficiently large value to give at least one —OR$^3$ group in each molecule, at least one such —OR³ group being present at the end of the molecular chain, and (C) a mixture of (A) and (B); (ii) 0.5 to 20 weight parts of at least one silicon compound selected from (a) an organosilicon compound of the general formula $R^4_d SiX_{4-d}$ in which $R^4$ is a monovalent hydrocarbon group having 1 to 5 carbon atoms, X is selected from a halogen atom or a hydrolyzable group and d has an average value of one or less, (b) a partially hydrolyzed condensate of said compound (a), (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, or (d) a condensate of said compound (c) with said compound (a) or (b); and (iii) a catalytic amount of a compound for promoting the reaction of components (i) and (ii); (II) at least one mineral oil; (III) at least one polydiorganosiloxane having at least one polyoxyalkylene group; and (IV) at least one finely divided filler. The silicone foam control compositions of this invention can optionally comprise a polyglycol.

The silicone foam control compositions of this invention comprise (I) a silicone antifoam agent, (II) at least one mineral oil, (III) at least one polydiorganosiloxane containing at least one polyoxyalkylene group, and (IV) at least one finely divided filler. Component (I) of the present invention can be prepared by reacting (i) a polyorganosiloxane, (ii) a silicon compound, and (iii) a catalytic amount of a compound for promoting the reaction of the other components.

Component (i) may be selected from (A) polyorganosiloxanes comprising siloxane units of the general formula $R^1_a SiO_{(4-a)/2}$ and having a viscosity of 20 to 100,000 mm²/s (centistokes (cS)) at 25° C. The organo groups $R^1$ of the polyorganosiloxane (A) are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the above formula, a has a value of 1.9 to 2.2. It is particularly preferred that polyorganosiloxane (A) is a trimethylsilyl-terminated polydimethylsiloxane having a viscosity of about 350 to 15,000 mm²/s at 25° C.

Alternatively, component (i) may be selected from (B) polyorganosiloxanes comprising siloxane units of the general formula $R^2_b (R^3 O)_c SiO_{(4-b-c)/2}$ and having a viscosity of 200 to 100 million centistokes at 25° C. wherein $R^2$ is independently selected from the monovalent hydrocarbon or halogenated hydrocarbon groups designated for group $R^1$, $R^3$ is a hydrogen atom or $R^2$, and the —OR³ group is present at least at the end of a molecular chain of the polyorganosiloxane. The value of b is from 1.9 to 2.2 and c has a value so as to provide at least one —OR³ group per molecule. It is particularly preferred that polyorganosiloxane (B) is a hydroxyl-terminated polydimethylsiloxane having a viscosity of about 1,000 to 50,000 mm²/s at 25° C. Component (i) may also be (C) a mixture of (A) and (B) in any proportion.

Component (ii) is at least one silicon compound selected from (a) to (d):(a) an organosilicon compound of the general formula $R^4_d SiX_{4-d}$ wherein $R^4$ is a monovalent hydrocarbon group having one to five carbon atoms, X is a halogen atom or a hydrolyzable group, such as —OR⁵ or —OR⁶OR⁷, in which $R^6$ is a divalent hydrocarbon group having one to five carbon atoms and $R^5$ and $R^7$ are each a hydrogen atom or a monovalent hydrocarbon group having one to five carbon atoms, the average value of d not exceeding 1, (b) a partially hydrolyzed condensate of the compound (a), (c) a siloxane resin comprising $(CH_3)_3SiO_{1/2}$ and $SiO_2$ units and having a $(CH_3)_3SiO_{1/2}/SiO_2$ ratio of 0.4/1 to 1.2/1, or (d) a condensate of the siloxane resin (c) with the compound (a) or (b).

It is preferred that component (ii) is selected from either an alkyl polysilicate wherein the alkyl group has one to five carbon atoms, such as methyl polysilicate, ethyl polysilicate and propyl polysilicate, or the siloxane resin (c). Most preferably, component (ii) is either ethyl polysilicate or a siloxane resin copolymer comprising $(CH_3)_3SiO_{1/2}$ units and $SiO_2$ units in a molar ratio of approximately 0.4:1 to 1.2:1.

Component (iii) is a compound used as a catalyst for promoting the reaction of the other components. Any compound which promotes condensation reactions or rearrangement/condensation reactions is suitable as component (iii). It is preferably selected from siloxane equilibration catalysts, silanol-condensing catalysts, or a combination thereof. Catalysts suitable as component (iii) are exemplified by alkali metal hydroxides such as potassium hydroxide, sodium hydroxide, or cesium hydroxide, alkali metal silanolates such as potassium silanolate, alkali metal alkoxides such as potassium isopropoxide or potassium ethoxide, quaternary ammonium hydroxides such as betahydroxyethyltrimethyl ammonium hydroxide, benzyltrimethyl ammonium hydroxide; and tetramethyl ammonium hydroxide, quaternary ammonium silanolates, quaternary phosphonium hydroxides such as tetrabutyl phosphonium hydroxide and tetraethylphosphonium hydroxide, quaternary phosphonium silanolates, metal salts of organic acids such as dibutyltin dilaurate, stannous acetate, stannous octanoate, lead napthenate, zinc octanoate, iron 2-ethylhexoate, and cobalt naphthenate, mineral acids such as sulfuric or hydrochloric acid, organic acids such as acetic acid or organosulfonic acids, and ammonium compounds such as ammonium carbonate or ammonium hydroxide. It is preferred that the catalyst is selected from potassium silanolate, potassium hydroxide, or sodium hydroxide.

The mixture can further comprise up to 30 weight parts of component (iv) a finely divided filler. The finely divided filler is exemplified by fumed, precipitated, or plasmatic $TiO_2$, $Al_2O_3$, $Al_2O_3/SiO_2$, $ZrO_2/SiO_2$, and $SiO_2$. The finely divided filler can hydrophilic or hydrophobic. The filler can be hydrophobed during manufacture (i.e. in-situ) or independently. Various grades of silica having a particle size of several millimicrons to several microns and a specific surface area of about 50 to 1000 m²/g, preferably a surface area of 50 to 300 m²/g, are commercially available and suitable for use as component (iv). Preferably component (iv) is a hydrophobic silica having a surface area of about 50 to 300 m²/g.

The mixture can further comprise up to 20 weight parts of component (v), a polyorganosiloxane comprising siloxane units of the general formula $R^8_e (R^9 O)_f SiO_{(4-e-f)/2}$ and having a viscosity of 5 to 200 mm²/s at 25° C. wherein $R^8$ is a monovalent hydrocarbon or halogenated hydrocarbon group having one to ten carbon atoms and $R^9$ is hydrogen or a monovalent hydrocarbon group having one to ten carbon atoms. The value of e is between 1.9 and 2.2 and f has a value so as to provide two or more —OR⁹ groups in each molecule. It is particularly preferred that component (v) is a hydroxyl-terminated polydimethylsiloxane having a viscosity of about 10 to 100 mm²/s at 25° C. It is preferred that component (v) is added when filler (iv) is a hydrophilic silica.

A mixture of components (i), (ii), and (iii), optionally containing components (iv) and/or (v), is reacted under heat to produce the silicone antifoam agent (I), the proportions of the various components being: Component (i)—100 weight parts; Component (ii) —0.5 to 20, preferably 1 to 7, weight parts; Component (iii) —A catalytic amount (usually in the range of 0.03 to 1 part by weight); Component (iv), if present, —up to 30, preferably 1 to 15, and highly preferred is 5 to 15 weight parts; Component (v), if present, —up to 20, preferably 1 to 10, weight parts.

The proportions of components (A) and (B) used depends largely on their respective viscosities. It is preferable to use a mixture of (A) and (B) which has a viscosity of 1,000 to 100,000 mm$^2$/s at 25° C.

The silicone antifoam agent (I) is prepared by first mixing components (i), (ii), and (iii) and heating this blend to about 110 to 120° C. Finely divided filler (iv), if desired, is then uniformly mixed in using an appropriate dispersing device, such as a homomixer, colloid mill or triple roll mill. The resulting mixture is heated at a temperature of 50° C. to 300° C., preferably 100° C. to 300° C., and reacted for one to eight hours, although the reaction time varies depending on the temperature. If component (v) is to be employed in the composition, it is generally added after the filler (iv). It is preferable to carry out all mixing and heating operations in an inert gas atmosphere in order to avoid any danger and to remove volatile matter (unreacted matter, by-products, etc.). The mixing order of the components and the heating temperature and time as hereinabove stated are not believed critical, but can be changed as required. It is further preferred that, after reaction, the catalyst is neutralized to further stabilize silicone antifoam agent (I).

Alternatively, silicone antifoam agent (I) preferably comprises a diorganopolysiloxane, a silicon compound, and a catalyst for promoting the reaction of these components, and this combination optionally containing a filler such as silica. These systems contain a mixture of a trimethylsilyl-terminated polydimethylsiloxane and a diorganopolysiloxane having silicon-bonded hydroxyl groups or silicon-bonded alkoxy groups along its main chain or at its chain ends, said alkoxy groups having from 1 to 6 carbon atoms. The silicon compound (ii) acts as a crosslinker for the diorganopolysiloxane by reacting with the functionality of the latter. It is further preferred that the above diorganopolysiloxane is either a linear or a branched polymer or copolymer of siloxane units selected from dimethylsiloxane units, methylphenylsiloxane units or methyltrifluoropropylsiloxane units. Most preferably, the diorganopolysiloxane of component (A) is a polydimethylsiloxane containing Si-bonded hydroxyl or methoxy functionality. The above mentioned silicon compound (ii) is preferably a siloxane resin comprising $(CH_3)_3SiO_{1/2}$ and $SiO_2$ units and having a molar ratio of $(CH_3)_3SiO_{1/2}/SiO_2$ between 0.4:1 and 1.2:1. The latter resin may be prepared according to methods taught in, e.g., U.S. Pat. No. 2,676,182 to Daudt et al. and typically contains from about 0.5 to about 3 weight percent of hydroxyl groups.

A highly preferred silicone antifoam agent is a homogeneous blend of a hydroxyl- terminated polydimethylsiloxane, a trimethylsilyl- terminated polydimethylsiloxane having a viscosity in the range of about 1,000 to 50,000 mm$^2$/s at 25° C., an alkyl polysilicate wherein the alkyl group has one to five carbon atoms, such as methyl polysilicate, ethyl polysilicate and propyl polysilicate, and a potassium silanolate catalyst reacted at a temperature of 50 to 300° C.

The silicone antifoam agent (I) can also be a silicone antifoam agent comprising (a) silicone and (b) silica and can be prepared by admixing a silicone fluid with a hydrophobic silica. In industrial practice, the term "silicone" has become a generic term which encompasses a variety of relatively high molecular weight polymers containing siloxane units and hydrocarbon groups of various types. Preferred as component (a) are polydimethylsiloxanes having a molecular weight within the range of from about 2,000 to about 200,000. Component (b) is exemplified by silica aerogels, xerogels, or hydrophobic silicas of various types. Any of several known methods may be used for making a hydrophobic silica which can be employed herein in combination with a silicone fluid as the antifoam agent. For example, a fumed silica can be reacted with a trialkyl chlorosilane (i.e. "silanated") to affix hydrophobic trialkylsilane groups on the surface of the silica. Silicas having organosilyl groups on the surface thereof are well known and can be prepared in many ways such as by contacting the surface of a fumed or precipitated silica or silica aerogel with reactive silanes such as chlorosilanes or alkoxysilanes or with silanols or siloxanols or by reacting the silica with silanes or siloxanes. Various grades of silica having a particle size of several millimicrons to several microns and a specific surface area of about 500 to 50 m$^2$/g are commercially available and several hydrophobic silicas having different surface treatments are also commercially available.

Component (I) is present in the silicone foam control compositions of this invention in an amount from 10–80 weight parts, preferably from 30 to 60 weight parts, and most preferably from 40 to 60 weight parts, said weight parts being based on the total weight of the composition.

Component (II) is mineral oil. The term "mineral oil" as used herein refers to hydrocarbon oils derived from carbonaceous sources, such as petroleum, shale, and coal, and equivalents thereof. The mineral oil of component (II) can be any type of mineral oil, many of which are commercially available, including heavy white mineral oil which is high in paraffin content, light white mineral oil, petroleum oils such as aliphatic or wax-base oils, aromatic or asphalt-base oils, or mixed base oils, petroleum derived oils such as lubricants, engine oils, machine oils, or cutting oils, and medicinal oils such as refined paraffin oil. The above mentioned mineral oils are available commercially at a variety of viscosities from Amoco Chemical Company (Chicago, Ill.) under the tradename Amoco White Mineral Oil, from Exxon Company (Houston, Tex.) under the tradenames Bayol™, Marcol™, or Primol™, from Lyondell Petrochemical Company (Houston, Tex.) under the trade name Duoprime® Oil, and from Shell Chemical Company (Houston, Tex.) under the tradename ShellFlex® Mineral Oil. Preferably the mineral oil has a viscosity of from about 1 to about 20 millipascal-seconds at 25° C. Component (II) can also be a mixture of the above-described mineral oils.

Component (II) is present in the silicone foam control compositions of this invention in an amount from 10–80 weight parts, preferably from 30 to 60 weight parts, and most preferably from 30 to 50 weight parts, said weight parts being based on the total weight of the composition.

Component (III) is at least one polydiorganosiloxane compound having at least one polyoxyalkylene group. The polyoxyalkylene group is exemplified by polyoxyalkylene groups having the formulae

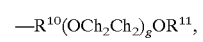

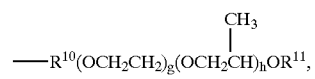

-continued

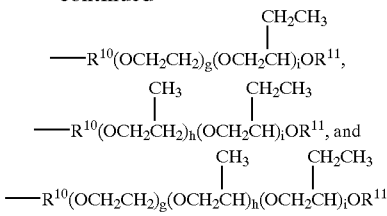
—R$^{10}$(OCH$_2$CH$_2$)$_g$(OCH$_2$CH)$_i$OR$^{11}$,

—R$^{10}$(OCH$_2$CH$_2$)$_h$(OCH$_2$CH)$_i$OR$^{11}$, and

—R$^{10}$(OCH$_2$CH$_2$)$_g$(OCH$_2$CH)$_h$(OCH$_2$CH)$_i$OR$^{11}$ wherein R$^{10}$ is a divalent hydrocarbon group having from 1 to 20 carbon atoms, R$^{11}$ is selected from a hydrogen atom, an alkyl group, an aryl group, or an acyl group, and g, h, and i independently have an average value from 1 to 150. As used herein to describe Component (III), the polydiorganosiloxane having at least one polyoxyalkylene group, it is understood that the various siloxane units and the oxyethylene, oxypropylene and oxybutylene units may be distributed randomly throughout their respective chains or in respective blocks of such units or in a combination of random or block distributions.

Those skilled in the art will appreciate that the term "polydiorganosiloxane having at least one polyoxyalkylene group" standing alone, encompasses a number of compounds, including those based upon cyclic and resinous siloxane compounds. While cyclic and resinous oxyalkylene-modified siloxanes can be used in the foam control compositions of this invention, they are comparatively expensive and thus, are not as cost effective as the linear polyoxyalkylene-containing polydiorganosiloxane compounds described hereinbelow.

Preferably Component (III) is a polydiorganosiloxane compound having the formula

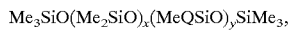
Me$_3$SiO(Me$_2$SiO)$_x$(MeQSiO)$_y$SiMe$_3$, wherein Q is selected from the group consisting of

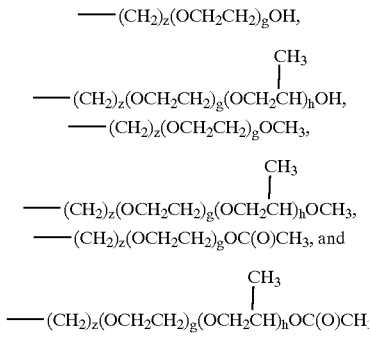
—(CH$_2$)$_z$(OCH$_2$CH$_2$)$_g$OH,

—(CH$_2$)$_z$(OCH$_2$CH$_2$)$_g$(OCH$_2$CH)$_h$OH,

—(CH$_2$)$_z$(OCH$_2$CH$_2$)$_g$OCH$_3$,

—(CH$_2$)$_z$(OCH$_2$CH$_2$)$_g$(OCH$_2$CH)$_h$OCH$_3$,

—(CH$_2$)$_z$(OCH$_2$CH$_2$)$_g$OC(O)CH$_3$, and

—(CH$_2$)$_z$(OCH$_2$CH$_2$)$_g$(OCH$_2$CH)$_h$OC(O)CH wherein Me denotes methyl, x has an average value from 100 to 500, y has an average value from 1 to 50, z has a value of 2 to 10, g has an average value of 1 to 36, and h has an average value of 1 to 36.

Component (III) of the silicone foam control compositions of this invention can also be a cross-linked polydiorganosiloxane polymer having at least one polyoxyalkylene group. This class of compounds has been generally described by Bahr et.al. in U.S. Pat. Nos. 4,853,474 and 5,136,068, incorporated herein by reference to teach cross-linked polydiorganosiloxane polymers suitable as (III). Compounds suitable as (III) include polydiorganosiloxane-polyoxyalkylene polymer molecules which are intentionally cross-linked through a cross-linking agent joined thereto by nonhydrolyzable bonds and being free of internal hydrolyzable bonds.

These may be obtained by a method comprising preparing a cross-linked polydiorganosiloxane polymer and combining a polyoxyalkylene group therewith or by a method comprising preparing a linear polyorganosiloxane having a polyoxyalkylene group combined therewith and cross-linking the same.

The cross-linking in this system can be attained through a variety of mechanisms. Those skilled in the art will readily recognize the systems wherein the required components are mutually compatible to carry out the method of preparing these polydiorganosiloxanes. By way of illustration, an extensive bibliography of siloxane polymer chemistry is provided in Siloxane Polymers, S. J. clarson and J. A. Semlyen eds., PTR Prentice Hall, Englewood cliffs, N.J., (1993).

Not to be construed as limiting this invention, it is preferred that the cross-linking bonds and the bonds to the polydiorganosiloxane-polyoxyalkylene molecules are not hydrolyzable, and that the cross-linking bridge contains no hydrolyzable bonds. It is recognized that similar emulsifiers wherein the polyoxyalkylene units are attached to the organopolysiloxane units via SiOC bonds are useful in applications not requiring extended stability under conditions where hydrolysis may occur. It is further recognized that such emulsifiers containing cross-links formed by SiOC bonds offer benefits of improved emulsion stability and consistency in such applications not requiring extended stability under conditions where hydrolysis may occur.

Preferably, the cross-linked polydiorganosiloxane polymer is obtained by the addition reaction between the following components: (i) an organopolysiloxane having an Si—H group at each of its terminals and a polydiorganosiloxane having at least two allyl groups in the side chains of each molecules thereof, or (ii) more preferably, an polydiorganosiloxane having at least two Si—H groups in the side chains of each molecule thereof, and a polydiorganosiloxane having each of its terminals blocked with an allyl group or a silanol group.

The preferred cross-linking radical is a vinyl-terminated polydiorganosiloxane used in combination with an Si—H containing backbone. This organosiloxane bridge should not contain any reactive sites for the polyoxyalkylene moieties. An organosiloxane bridge cooperates with the siloxane backbones which it bridges to create a siloxane network at the interface of water and the silicone antifoam agent. This network is thought to be important in effecting the stabilizing properties and characteristics of the present invention. The siloxane bridge works with other types of antifoams. Other bridge types may be more suitable for non-silicone antifoams (e.g. an alkane bridge for mineral oil based antifoams).

The cross-linked polydiorganosiloxane polymer to be used as (III) should be one that satisfies the following conditions: (1) it has a three-dimensional crosslinked structure, (2) it has at least one polyoxyalkylene group, and (3) it has fluidity (i.e. it is "free flowing"). The term "three-dimensional cross-linked structure" used herein denotes a structure in which at least two organopolysiloxane molecules are bonded together through at least one bridge.

The exact number of polydiorganosiloxane-polyoxyalkylene polymer molecules which will be bridged together will vary within each compound. One limitation on such cross-linking is that the overall molecular weight must not become so great as to cause the material to gel. The extent of cross-linking must thus also be regulated relative to the molecular weight of each individual polymer molecule being cross-linked since the overall molecular weight must also be maintained sufficiently low to avoid gelling. In controlling the cross-linking reaction there is also the possibility that some un-cross linked material will be present.

In the present invention, it is preferred that component (III) is a compound having a viscosity of 100 to 100,000 mm$^2$/s at 25° C. and having the unit formula:

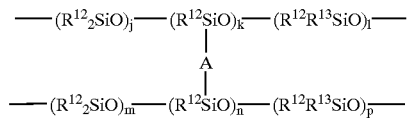

wherein $R^{12}$ is a monovalent hydrocarbon group, A is a group having the formula $(Ch_2)_q$—$(R^{14}{}_2SiO)_r Si(Ch_2)_s$ or the formula $O(R^{14}{}_2SiO)_r$—SiO wherein $R^{14}$ denotes a monovalent hydrocarbon group, q has a value of 2 to 10, r has a value of 1 to 5000, s has a value of 2 to 10, $R^{13}$ denotes a group having its formula selected from the group consisting of:

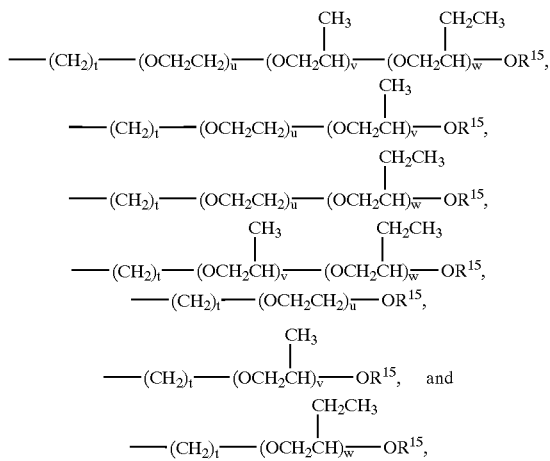

wherein $R^{15}$ is selected from a hydrogen atom, an alkyl group, an aryl group, or an acyl group, t has a value of 2 to 10, u has a value of from greater than zero to 150, v has a value of from greater than zero to 150, and w has a value of from greater than zero to 150, j has a value of 1 to 1000, k has a value of from greater than zero to 30, l has a value of 1 to 1000, m has a value of 1 to 1000, n has a value of from greater than zero to 30, p has a value of 1 to 1000. The groups $R^{12}$ and $R^{14}$ can be the same or different as desired and are preferably alkyl groups or aryl groups and it is highly preferred that they are both methyl.

In the formulae hereinabove, it is preferred that j has a value of 1 to 500 and it is highly preferred that j has a value of 1 to 250, it is preferred that k has a value of from greater than zero to 20 and it is highly preferred that k has a value of from 1 to 15, it is preferred that l has a value of 1 to 100 and it is highly preferred that l has a value of 1 to 50, it is preferred that m has a value of 1 to 500 and it is highly preferred that m has a value of 1 to 250, it is preferred that n has a value of from greater than zero to 20 and it is highly preferred that n has a value of from greater than 1 to 15, it is preferred that p has a value of 1 to 100 and it is highly preferred that p has a value of 1 to 50, it is preferred that q has a value of 2 to 6, it is preferred that r has a value of 1 to 2500 and it is highly preferred that r has a value of 20 to 1000, it is preferred that s has a value of 2 to 6, it is preferred that t has a value of 2 to 4, it is preferred that u has a value of from 1 to 100 and it is highly preferred that u has a value of 5 to 50, it is preferred that v has a value of from 1 to 100 and it is highly preferred that v has a value of 5 to 50, it is preferred that w has a value of from 1 to 100 and it is highly preferred that w has a value of 1 to 50. It is preferred that the cross-linked polydiorganosiloxane polymer of component (III) is triorganosiloxy endblocked at each terminal of the polymer, and it is highly preferred that the polymer is trimethylsiloxy endblocked at each terminal of the cross-linked polymer.

The method used to prepare the crosslinked polydiorganosiloxane polymers is disclosed in European Patent Application No. 0663225. A specific example of the method for producing the crosslinked polydiorganosiloxane polymers will now be described. Preparation of a crosslinked polydiorganosiloxane polymer was done through the following steps: (I) a charging step in which a linear polysiloxane having hydrogen atoms in its side chains, a polysiloxane having vinyl groups and a catalyst for promoting the reaction, particularly platinum catalysts such as an isopropanol solution of $H_2PtCl_6 6H_2O$ with a 2% methanol solution of sodium acetate are put in a reactor, (II) an agitation/heating step in which agitation is conducted, for example, at 40° C. for 30 minutes, (III) an input step in which a polyoxyalkylene and a solvent (isopropanol) are put in the reactor, (IV) a reflux step in which the isopropanol is refluxed, for example, at 80° C. for 1.5 to 2 hours while monitoring the reaction rate of Si—H, (V) a stripping step in which the isopropanol is stripped, for example, at 130° C. under a reduced pressure of 25 mmHg, and (VI) a final step in which the reduced pressure condition of step (V) is released and the reaction mixture is cooled to 60° C. to obtain a final product.

An example of a linear polysiloxane having hydrogen atoms in its side chains suitable for step (I) is a polysiloxane having its formula selected from:

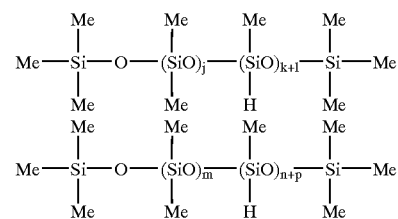

wherein Me hereinafter denotes methyl and j, k, l, m, n, and p are as defined above. An example of a polysiloxane having vinyl groups suitable for step (I) is a polysiloxane having the formula:

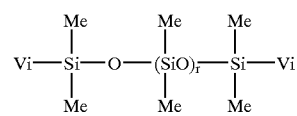

wherein Me denotes methyl, Vi hereinafter denotes vinyl, and r is as defined above. The reaction of these two compounds in step (II) results in a cross-linked siloxane polymer having the formula

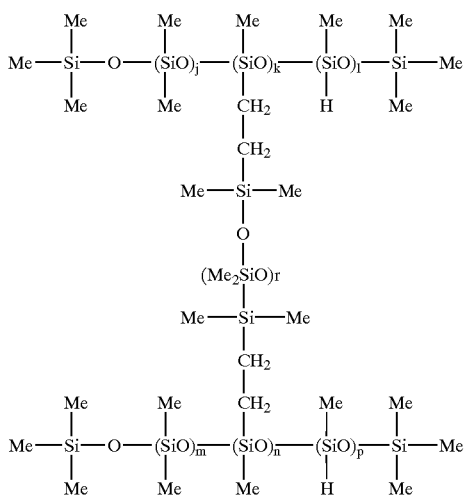

Introduction of a polyoxyalkylene group into the obtained crosslinked organopolysiloxane polymer (steps III–VI) is accomplished by reacting the crosslinked polymer with a polyoxyalkylene compound having its formula selected from the group consisting of

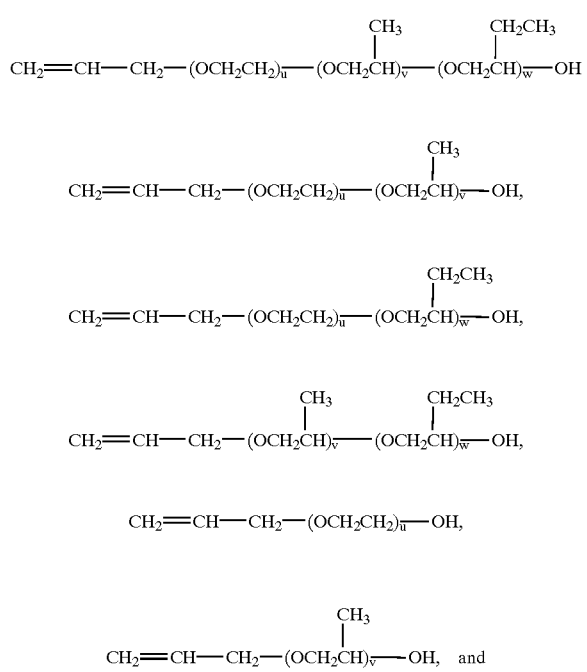

wherein u, v, and w are as defined above.

Preferred as Component (III) are cross-linked polydiorganosiloxane polymers having the formula

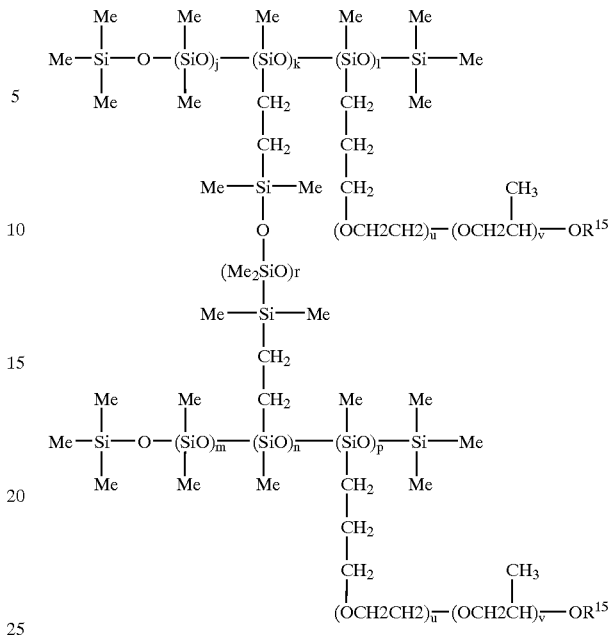

wherein Me denotes methyl, j has a value of 1 to 250, k has a value of from 1 to 15, l has a value of 1 to 50, m has a value of 1 to 250, n has a value of from greater than 1 to 15, p has a value of 1 to 50, r has a value of 20 to 1000, u has a value of 5 to 50, v has a value of 5 to 50, and $R^{15}$ is hydrogen, methyl, or $C(O)CH_3$.

Component (III) is present in the silicone foam control compositions of this invention in an amount from 1–50 weight parts, preferably from 5 to 20 weight parts, and most preferably from 10 to 20 weight parts, said weight parts being based on the total weight of the composition.

Component (IV) is at least one finely divided filler. The finely divided filler is exemplified by fumed, precipitated, or plasmatic $TiO_2$, $Al_2O_3$, $Al_2O_3/SiO_2$, $ZrO_2/SiO_2$, and $SiO_2$. The finely divided filler can be hydrophilic or hydrophobic. The filler can be hydrophobed during manufacture (i.e. in-situ) or independently. Various grades of silica having a particle size of several millimicrons to several microns and a specific surface area of about 50 to 1000 $m^2/g$, preferably a surface area of 50 to 300 $m^2/g$, are commercially available and suitable for use as component (iv). Preferably component (IV) is a hydrophobic silica having a surface area of about 50 to 300 $m^2/g$. Hydrophobic precipitated silicas are especially preferred as component (IV).

Component (IV) is present in the silicone foam control compositions of this invention in an amount from 1–20 weight parts, preferably from 1 to 10 weight parts, and most preferably from 2 to 6 weight parts, said weight parts being based on the total weight of the composition.

The silicone foam control compositions of this invention can further comprise (V) a polyglycol. The polyglycol is exemplified by polyethylene glycol, polypropylene glycol, polyethylene glycol-polypropylene glycol copolymers, condensates of polyethylene glycol with polyols, condensates of polypropylene glycol with polyols, and condensates of polyethylene glycol-polypropylene glycol copolymers with polyols.

Component (V), if used, is present in the silicone foam control compositions of this invention in an amount from 1–50 weight parts, preferably from 5 to 20 weight parts, and most preferably from 10 to 20 weight parts, said weight parts being based on the total weight of the composition.

In addition to the above-mentioned components, the silicone foam control compositions of the present invention may also contain adjuvants such as corrosion inhibitors and dyes. The compositions of the present invention may be prepared by blending components (I)–(IV), and any optional components, to form a homogenous mixture. This may be accomplished by any convenient mixing method known in the art such as a spatula, mechanical stirrers, in-line mixing systems containing baffles, blades, or any of the like mixing surfaces including powered in-line mixers or homogenizers, a drum roller, a three-roll mill, a sigma blade mixer, a bread dough mixer, and a two roll mill. The order of mixing is not considered critical.

The present invention also relates to a process for controlling foam in a foaming system wherein the above-described silicone foam control composition is added to a foaming or foam-producing system, in an amount sufficient to reduce foaming, as determined by routine experimentation. Typically, the silicone foam control compositions of the present invention are added at a concentration of about 0.001 to 0.1 weight parts based on the weight of the foaming system, however the skilled artisan will readily determine optimum concentrations after a few routine experiments. The method of addition is not critical, and the composition may be metered in or added by any of the techniques known in the art. Examples of foaming systems contemplated herein include media encountered in the production of phosphoric acid and in sulphite or sulphate process pulping operations, bauxite digestion medium in the production of aluminum, metal working fluids, paper manufacture, detergent systems, hydrocarbon based systems, etc. The compositions of the present invention can be used as any kind of foam control composition, i.e. as defoaming compositions and/or antifoaming compositions. Defoaming compositions are generally considered as foam reducers whereas antifoaming compositions are generally considered as foam preventors. The compositions of this invention find utility as foam control compositions in various media such as inks, coatings, paints, detergents, pulp and paper manufacture, textile dyes, textile scours, and hydrocarbon containing fluids.

EXAMPLES 1–7

Each of the silicone foam control compositions were prepared by mixing the ingredients in Table 1 hereinbelow. The amounts listed in the Examples below are in weight parts and the viscosity was measured at 25° C. unless otherwise indicated. The ingredients used in the Examples are defined as follows:

Silicone Antifoam Agent 1 was prepared according to the method disclosed in Example 1 of Aizawa et al in U.S. Pat. No. 4,639,489. The amounts of ingredients used were as follows: 59.2 weight parts of a trimethylsiloxy-terminated polydimethylsiloxane having a viscosity of 1000 mm$^2$/s at 25° C., 28.2 weight parts of a hydroxy-terminated polydimethylsiloxane having a viscosity of 12,500 mm$^2$/s at 25° C., 2.8 weight parts of ethyl polysilicate ("Silicate 45" from Tama Kagaku Kogyo Co., Ltd., Japan); 1.3 weight parts of a potassium silanolate catalyst, 2.8 parts of Aerosil 200 Silica (silica having a surface area of 200 m$^2$/g from Degussa-Huls Corporation), and 4.8 weight parts of hydroxy-terminated polydimethylsiloxane having a viscosity of 40 mm$^2$/s at 25° C. In addition to the above ingredients, this formulation also included 0.625 weight parts of water, 0.005 weight parts of Silwet® L-77 Silicone Glycol (from CKWITCO Corporation) and 0.09 weight parts of L-540 Silicone Glycol (a silicone polyether block copolymer wherein the polyether blocks consist of 50/50 mole percent of polyoxyethylene/polyoxypropylene from Union Carbide Corp., Danbury, Conn.).

Silicone Antifoam Agent 2 is a reaction product prepared according to the method of John et al. as described in EP 0217501, and was prepared by mixing together 64.3 weight parts of a trimethylsiloxy-terminated polydimethylsiloxane, 3.42 weight parts of a silicone resin, 32 weight parts of a hydroxyl-terminated polydimethylsiloxane, and 0.15 weight parts of a catalyst containing 10 wt % potassium hydroxide in isopropyl alcohol. The mixture was reacted at 80° C. with mixing for 5 hours and neutralized with 0.015 weight parts glacial acetic acid and 0.14 weight parts water.

Silicone Antifoam Agent 3 was prepared by heating a mixture of: 91 weight parts of a trimethylsiloxy-endblocked polydimethylsiloxane having a viscosity of 500 millipascal-seconds at 25° C., 3 parts of hydroxyl-terminated polydimethylsiloxane, 6 parts hydrophobic silica, and 0.025 parts ammonium carbonate.

Mineral Oil 1 is Shellflex® 6111 Mineral Oil, a light mineral oil having a viscosity of about 3 mm$^2$/s at 40° C. from Shell Chemical Company, Houston, Tex.

Mineral Oil 2 is Duoprime® 55, a white mineral oil having a viscosity of about 10 millipascal-seconds at 25° C. from Lyondell Petrochemical Company, Houston, Tex.

Polydorganosiloxane 1 is a cross-linked polydiorganosiloxane polymer having at least one polyoxyalkylene group prepared by the method described in Tonge et al in European Patent Application No. 0663225, as follows:

Component (A1): was a linear polysiloxane having the formula:

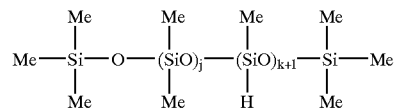

Wherein Me denotes methyl, j has a value in the range of 70 to 110, and k+1 is in the range of 5 to 15.

Component (B1): was a polysiloxane having the formula

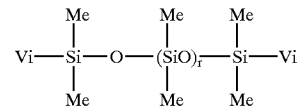

wherein Me denotes methyl, Vi denotes vinyl, and wherein the polysiloxane has a molecular weight ranging from 8000 to 25,000.

Component (C1): was a polyoxyalkylene having the formula:

having a molecular weight in the range of from 2000 to 4000 and the ratio of u:v is 1:1.

Component (D): was isopropanol (as a solvent).

Component (E): was a 2% isopropanol solution of H$_2$PtCl$_6$.6H$_2$O.

In the Examples, A1 had values of j=108, and k+1=10, B1 had a molecular weight of approximately 11,000, and C1 had a molecular weight of approximately 3,100. The polydiorganosiloxane was prepared by adding 12.8 parts of (A1), 2.6 of (B1) into a reactor, mixing, and heating to 80° C. Next, 0.001 parts of (E) were added and the mixture was reacted for 60 minutes. 60.2 parts of (C1) and 24.4 parts of (D) were then added. The mixture was heated to 90° C. 0.001 additional parts of (E) were added. The mixture was reacted at 90° C. for 2 hours, followed by a vacuum strip to remove the isopropanol. The mixture was cooled and filtered.

weight parts of a stannous octoate, 0.1 weight parts of phosphoric acid was added and the product was blended with 40 weight parts of a polyethylene glycol-polypropylene glycol copolymer. The product was stripped at 5.3 kPa at 140° C. to remove xylene and filtered.

Stabilizing Aid 1 is Aerosil® 972, a fumed silica that has been treated to a moderate level with dichlorodimethylsilane, having a surface area of 110 m²/g, a methanol wettability of 45%, and is available from Degussa Corp. (Ridgefield Park, N.J.).

TABLE 1

| Ingredients | Ex 1 | Ex 2 | Ex 3 | Ex 4 | Ex 5 | Ex 6 | Ex 7 | Ex 8 | Ex 9 |
|---|---|---|---|---|---|---|---|---|---|
| Silicone Antifoam Agent 1 | 46 | 46 | 46 | 0 | 0 | 46 | 46 | 40 | 41.5 |
| Silicone Antifoam Agent 2 | 0 | 0 | 0 | 46 | 0 | 0 | 0 | 0 | 0 |
| Silicone Antifoam Agent 3 | 0 | 0 | 0 | 0 | 46 | 0 | 0 | 0 | 0 |
| Mineral Oil 1 | 37 | 37 | 37 | 37 | 37 | 0 | 37 | 37 | 41.5 |
| Mineral Oil 2 | 0 | 0 | 0 | 0 | 0 | 37 | 0 | 0 | 0 |
| Polydiorganosiloxane 1 | 13 | 0 | 0 | 13 | 13 | 13 | 13 | 13 | 13 |
| Polydiorganosiloxane 2 | 0 | 13 | 0 | 0 | 0 | 0 | 0 | 0 | 0 |
| Polydiorganosiloxane 3 | 0 | 0 | 13 | 0 | 0 | 0 | 0 | 0 | 0 |
| Silica 1 | 4 | 4 | 4 | 4 | 4 | 4 | 0 | 0 | 4 |
| Silica 2 | 0 | 0 | 0 | 0 | 0 | 0 | 4 | 5 | 0 |
| Polyglycol 1 | 0 | 0 | 0 | 0 | 0 | 0 | 0 | 5 | 0 |

Polydiorganosiloxane 2 is an oxyalkylene-containing polydimethylsiloxane having the formula

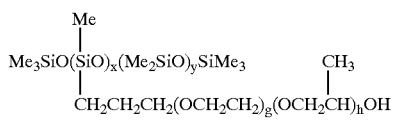

where Me denotes methyl, x=4, y=396, g=18, and h=18. The polydimethylsiloxane was diluted to a level of 47% in cyclosiloxanes.

Polydiorganosiloxane 3 is an oxyalkylene-containing polydimethylsiloxane having the formula

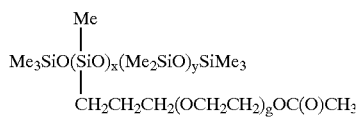

where Me denotes methyl, x=2, y=22, and g=12.

Silica 1 is Sipernat® D10, a hydrophobic silica from Degussa Corp. (Ridgefield Park, N.J.).

Silica 2 is Sipernat® D13, a hydrophobic silica from Degussa Corp. (Ridgefield Park, N.J.).

Polyglycol 1 is Polyglycol E-8000, a polyethylene glycol having molecular weight of about 8000 from The Dow Chemical Company (Midland, Mich.).

Continuous Phase 1 is P15–200®, an ethylene oxide/propylene oxide triol copolymer with glycerin having a number average molecular weight of 2,600 from The Dow Chemical Company (Midland, Mich.).

Surfactant 1 is a nonionic silicone surfactant of trimethylsilyl end capped polysilicate prepared according to the method described in Keil, U.S. Pat. No. 3,784,479. A mixture of 7 weight parts of a siloxane resin (which is a 70% xylene solution of a hydroxy-functional siloxane resin copolymer comprising $(CH_3)_3SiO_{1/2}$ and $SiO_2$ units having a $(CH_3)_3SiO_{1/2}$ to $SiO_2$ ratio of 0.75:1), 15 weight parts of a copolymer of ethylene oxide and propylene oxide having a number average molecular weight of 4000, and 38 weight parts of xylene was reacted at reflux for 8 hours with 0.2

COMPARISON EXAMPLES 1–3

Each of the comparison silicone foam control compositions were prepared by mixing the ingredients in Table 2 hereinbelow. The amounts listed in Table 2 below are in weight parts.

TABLE 2

| Ingredients | C Ex 1 | C Ex 2 | C Ex 3 |
|---|---|---|---|
| Silicone Antifoam Agent 1 | 46 | 46 | 46 |
| Silicone Antifoam Agent 2 | 0 | 0 | 0 |
| Silicone Antifoam Agent 3 | 0 | 0 | 0 |
| Mineral Oil 1 | 0 | 0 | 0 |
| Mineral Oil 2 | 0 | 0 | 0 |
| Polydiorganosiloxane 1 | 0 | 50 | 0 |
| Polydiorganosiloxane 2 | 0 | 0 | 50 |
| Polydiorganosiloxane 3 | 50 | 0 | 0 |
| Silica 1 | 0 | 0 | 0 |
| Silica 2 | 4 | 4 | 4 |

COMPARISON EXAMPLES 4–8

Comparison Examples 4, 5, and 8 were prepared by mixing together the ingredients listed in Table 3 using moderate mechanical agitation. The amounts listed in Table 3 below are in weight parts. Comparison Examples 6 and 7 were prepared by mixing the amounts specified in Table 3 below for Silicone Antifoam Agent 1 with that for Silica 1 to form a premix, then blending this premix with Polydiorganosiloxane 1 in the amount specified in Table 3 below using moderate mechanical agitation.

TABLE 3

| Ingredients | C Ex 4 | C Ex 5 | C Ex 6 | C Ex 7 | C Ex 8 |
|---|---|---|---|---|---|
| Silicone Antifoam Agent 1 | 50 | 50 | 46 | 26 | 30 |
| Silicone Antifoam Agent 2 | 0 | 0 | 0 | 0 | 0 |

TABLE 3-continued

| Ingredients | C Ex 4 | C Ex 5 | C Ex 6 | C Ex 7 | C Ex 8 |
|---|---|---|---|---|---|
| Silicone Antifoam Agent 3 | 0 | 0 | 0 | 0 | 0 |
| Mineral Oil 1 | 0 | 0 | 0 | 0 | 0 |
| Mineral Oil 2 | 0 | 0 | 0 | 0 | 0 |
| Continuous Phase 1 | 0 | 0 | 0 | 0 | 0 |
| Polydiorgano-siloxane 1 | 50 | 0 | 50 | 70 | 70 |
| Polydiorgano-siloxane 2 | 0 | 50 | 0 | 0 | 0 |
| Polydiorgano-siloxane 3 | 0 | 0 | 0 | 0 | 0 |
| Silica 1 | 0 | 0 | 4 | 4 | 0 |

COMPARISON EXAMPLES 9–11

Comparison Examples 9 and 10 were prepared by mixing together the ingredients listed in Table 4 using moderate mechanical agitation. The amounts listed in Table 4 below are in weight parts. Comparison Example 11 was prepared by mixing the amounts specified in Table 4 below for Silicone Antifoam Agent 1 with that for Silica 1 to form a premix, then blending this premix with Mineral Oil 1 in the amount specified in Table 4 below using moderate mechanical agitation.

TABLE 4

| Ingredients | C Ex 9 | C Ex 10 | C Ex 11 |
|---|---|---|---|
| Silicone Antifoam Agent 1 | 50 | 50 | 46 |
| Silicone Antifoam Agent 2 | 0 | 0 | 0 |
| Silicone Antifoam Agent 3 | 0 | 0 | 0 |
| Mineral Oil 1 | 50 | 0 | 50 |
| Mineral Oil 2 | 0 | 50 | 0 |
| Continuous Phase 1 | 0 | 0 | 0 |
| Polydiorganosiloxane 1 | 0 | 0 | 0 |
| Polydiorganosiloxane 2 | 0 | 0 | 0 |
| Polydiorganosiloxane 3 | 0 | 0 | 0 |
| Silica 1 | 0 | 0 | 4 |

COMPARISON EXAMPLES 12–13

Comparison Example 12 was prepared by adding 31 parts of Silicone Antifoam Agent 1 to a combination of 4 parts of Surfactant 1 in 42 parts of Continuous Phase 1 under moderate mechanical agitation. The resulting mixture was then added to a premix containing 2 parts of Stabilizing Aid 1 in 21 parts of Continuous Phase 1.

Comparison Example 13 was prepared by making a premix of 36 parts of Silicone Antifoam Agent 1 with 4 parts of Silica 2 under moderate mechanical agitation. This premix was then added to a mixture of 2.5 parts of Stabilizing Aid 1 in 57.5 parts of Continuous Phase 1 under mechanical agitation.

TABLE 5

| Ingredients | C Ex 12 | C Ex 13 |
|---|---|---|
| Silicone Antifoam Agent 1 | 31 | 36 |
| Silicone Antifoam Agent 2 | 0 | 0 |
| Silicone Antifoam Agent 3 | 0 | 0 |
| Mineral Oil 1 | 0 | 0 |
| Mineral Oil 2 | 0 | 0 |
| Continuous Phase 1 | 63 | 57.5 |
| Polydiorganosiloxane 1 | 0 | 0 |
| Polydiorganosiloxane 2 | 0 | 0 |
| Polydiorganosiloxane | 0 | 0 |
| Surfactant 1 | 4 | 0 |
| Stabilizing Aid 1 | 2 | 2.5 |
| Silica 1 | 0 | 0 |
| Silica 2 | 0 | 4 |

Test Protocols

Foam control composition samples prepared according to the above examples and comparative examples were added to portions of the following detergent prototype, and the resulting compositions were evaluated as to wash foam production and stability.

Detergent Prototype Formulation (Percentages given are by weight and do not add up to 100.0 due to Rounding)
- 29.8% Distilled Water
- 33.7% Witcolate LES-60C by Witco (contains an alkyl ether sulfate)
- 15.7% Glucopon 600 UP by Henkel (contains an alkyl polyglycoside)
- 8.3% Sodium Citrate
- 7.0% Propylene Glycol
- 2.6% Neodol 23.6.5 by Shell Chemical Company (a linear alcohol ethoxylate)
- 2.0% Ethanolamine
- 1.0% Emery 621 Coconut Fatty Acid (by Henkel)

Wash Foam Test

General Electric Model WWA7678MALWH washing machines were loaded in turn with twelve 106.7 cm×58.4 cm towels (86% cotton, 14% polyester) for ballast and filled with 68.1 liters water of 0 ppm hardness containing 112 g of the detergent prototype and 0.112 g of the foam control compositions (0.1 weight %) of the examples and comparative examples. The foam height was measured at various times during a 12 minute wash cycle as summarized in Table VI below. Thus, "Ht3" refers to the foam height in the washer after 3 minutes into the washer cycle, going up to "Ht12" for 12 minutes into the cycle. Foam heights are given as 99 if there was foam out of the machine. To obtain "Wash Results" ratings, foams heights after 12 minutes into the cycle were characterized as "Good" if less than 1.5 cm, "OK" if from 1.5–7 cm and "Fail" if over 7 cm.

Stability Test

Samples of foam control compositions were prepared according to the above examples and comparative examples and mixed with prototype detergent such that the foam control composition was 1% by weight of the final composition. The resulting blends were allowed to stand for one week and visually evaluated according to the following rating.

1=clear with no or very little surface scum or "collar" around the container wall.

2=slight amount of collar or surface scum/oil; can be re-dispersed into detergent.

3=fair amount of collar or surface scum/oil; more difficult to re-disperse.

4=significant collar or surface scum/oil; hard to re-disperse

5=agglomeration or coalescence of silicone visible and cannot be re-dispersed.

TABLE 6

| Example | Ht 3 Avg (cm) | Ht 6 Avg (cm) | Ht 9 Avg (cm) | Ht 12 Avg (cm) | Wash Results | Stability Results |
|---|---|---|---|---|---|---|
| Ex 1 | 0.50 | 1.00 | 1.67 | 4.08 | OK | 2 |
| Ex 2 | −1.17 | 1.00 | 1.00 | 2.92 | OK | 1 |
| Ex 3 | 0.50 | 0.75 | 1.00 | 0.67 | Good | 1 |
| Ex 4 | 0.50 | 0.50 | 1.17 | 3.33 | OK | 4 |
| Ex 5 | 3.25 | 6.17 | 8.17 | 99.00 | Fail | 2 |
| Ex 6 | 0.00 | 0.50 | 0.50 | 0.92 | Good | 3 |
| Ex 7 | 0.00 | 0.00 | 0.00 | 0.50 | Good | 2 |
| Ex 8 | 0.00 | 0.50 | 0.50 | 1.42 | Good | 3 |
| Ex 9 | 2.08 | 4.42 | 5.50 | 6.08 | OK | 2 |
| Comp Ex 1 | 0.50 | 1.83 | 2.00 | 4.42 | OK | 5 |
| Comp Ex 2 | 6.42 | 99 | 99 | 99 | Fail | 3 |
| Comp Ex 3 | 0.50 | 1.00 | 1.83 | 3.08 | OK | 5 |
| Comp Ex 4 | 13.00 | 99 | 99 | 99 | Fail | 1 |
| Comp Ex 5 | 2.50 | 3.08 | 3.00 | 3.00 | OK | 5 |
| Comp Ex 6 | 9.67 | 99 | 99 | 99 | Fail | 4 |
| Comp Ex 7 | 99 | 99 | 99 | 99 | Fail | 4 |
| Comp Ex 8 | 99 | 99 | 99 | 99 | Fail | 4 |
| Comp Ex 9 | 99 | 99 | 99 | 99 | Fail | 2 |
| Comp Ex 10 | 99 | 99 | 99 | 99 | Fail | 2 |
| Comp Ex 11 | 1.58 | 4.67 | 9.42 | 99 | Fail | 3 |
| Comp Ex 12 | 1.25 | 4.58 | 4.75 | 8.50 | Fail | 4 |
| Comp Ex 13 | 0.50 | 0.50 | 0.50 | 0.50 | Good | 3 |

That which is claimed is:

1. A silicone foam control composition comprising:

(I) a silicone antifoam agent prepared by reacting at a temperature of 50° C. to 300° C. a mixture comprising:
  (i) 100 weight parts of at least one polyorganosiloxane selected from the group consisting of
    (A) a polyorganosiloxane having a viscosity of about 20 to 100,000 mm$^2$/s at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2;
    (B) a polyorganosiloxane having a viscosity of 200 to about 100 million mm$^2$/s at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —OR$^3$ group in each molecule, at least one such —OR$^3$ group being present at the end of the molecular chain; and
    (C) a mixture of (A) and (B);
  (ii) 0.5 to 20 weight parts of at least one silicon compound selected from the group consisting of
    (a) an organosilicon compound of the general formula $R^4_d SiX_{4-d}$ in which $R^4$ is a monovalent hydrocarbon group having 1 to 5 carbon atoms, X is a halogen atom or a hydrolyzable group, and d has an average value of one or less;
    (b) a partially hydrolyzed condensate of said compound (a);
    (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1; and
    (d) a condensate of said compound (c) with said compound (a) or (b); and
  (iii) a catalytic amount of a compound for promoting the reaction of components (i) and (ii);

(II) at least one mineral oil;
(III) a compound having a viscosity of 100 to 100,000 mm$^2$/s at 25° C. and having the unit formula:

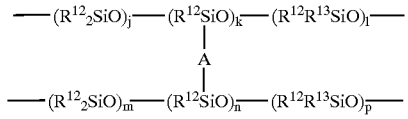

wherein $R^{12}$ is a monovalent hydrocarbon group, A is a group having the formula $(Ch_2)_q$—$(R^{14}_2SiO)_r Si(Ch_2)_s$ or the formula $O(R^{14}_2SiO)_r$—SiO wherein $R^{14}$ denotes a monovalent hydrocarbon group, q has a value of 2 to 10, r has a value of 1 to 5000, s has a value of 2 to 10, $R^{13}$ denotes a group having its formula selected from the group consisting of:

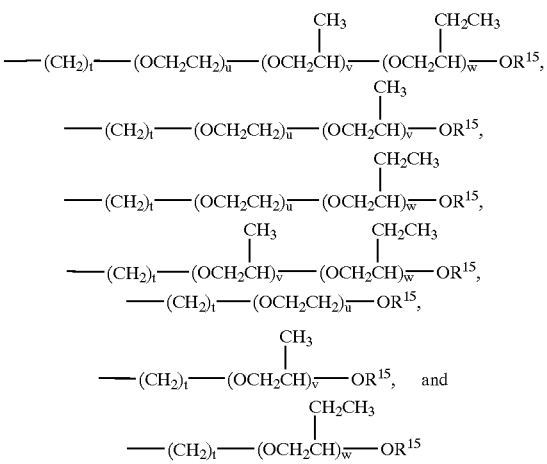

wherein $R^{15}$ is selected from a hydrogen atom, an alkyl group, an acyl group, or an acyl group, t has a value of 2 to 10, u has a value of from greater than zero to 150, v has a value of from greater than zero to 150, and w has a value of from greater than zero to 150, j has a value of 1 to 1000, k has a value of from greater than zero to 30, l has a value of 1 to 1000, m has a value of 1 to 1000, n has a value of from greater than zero to 30, p has a value of 1 to 1000; and (IV) at least one finely divided filler.

2. A composition according to claim 1, wherein the mixture of (I) further comprises up to 30 weight parts of (iv) a finely divided filler.

3. A composition according to claim 2, wherein (iv) is a hydrophobic silica having a surface area of 50 to 300 m$^2$/g.

4. A composition according to claim 3, wherein
  (A) is a trimethylsilyl-terminated polydimethylsiloxane having a viscosity of about 350 to 15,000 mm$^2$/s at 25° C.,
  (B) is a hydroxyl-terminated polydimethylsiloxane having a viscosity of about 1,000 to 50,000 mm$^2$/s at 25° C.,
  (ii) is ethyl polysilicate or a siloxane resin copolymer comprising $(CH_3)_3SiO_{1/2}$ units and $SiO_2$ units in a molar ratio of approximately 0.4:1 to 1.2, and
  (iii) is potassium hydroxide, sodium hydroxide, potassium silanolate, ammonium carbonate, or ammonium hydroxide.

5. A composition according to claim 4, wherein (II) is a mineral oil having a viscosity from 1 to 20 millipascal-seconds at 25° C.

6. A composition according to claim 5, wherein (III) is a polydiorganosiloxane having the formula

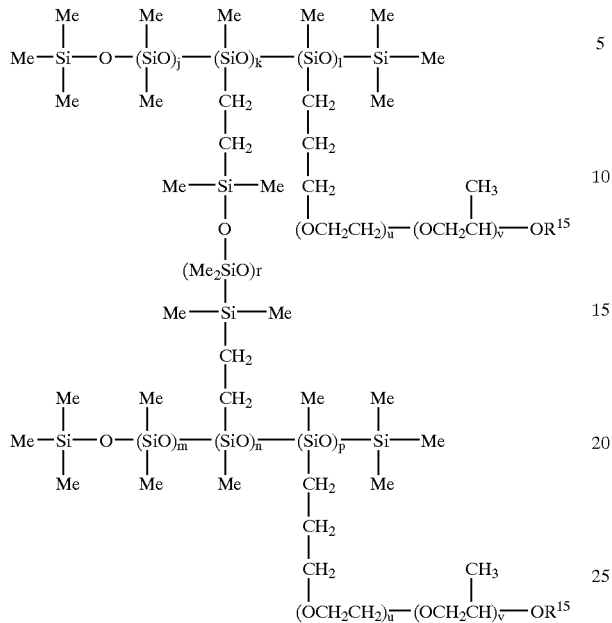

14. A composition according to claim 13, wherein (III) is a polydiorganosiloxane having the formula

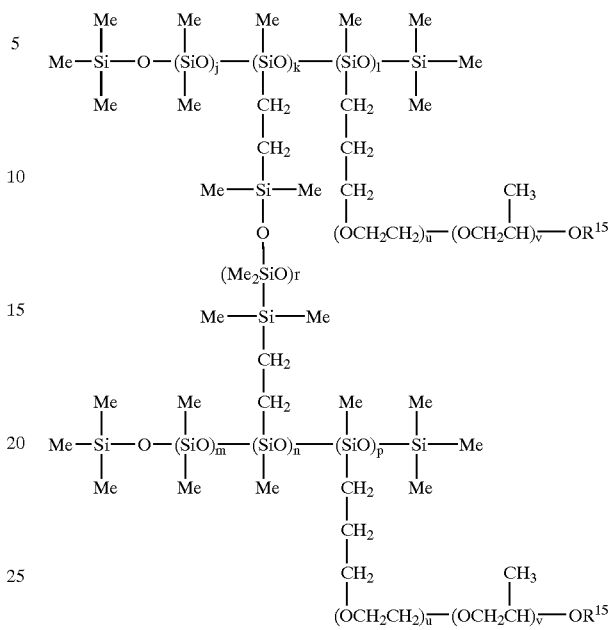

wherein Me denotes methyl, j has a value of 1 to 250, k has a value of from 1 to 15, l has a value of 1 to 50, m has a value of 1 to 250, n has a value of from greater than 1 to 15, p has a value of 1 to 50, r has a value of 20 to 1000, u has a value of 5 to 50, v has a value of 5 to 50, and $R^{15}$ is hydrogen, methyl, or $C(O)CH_3$.

7. A composition according to claim 6, wherein (IV) is a hydrophobic silica having a surface area of 50 to 300 $m^2/g$.

8. A composition according to claim 7, wherein the composition further comprises (V) a polyglycol.

9. A composition according to claim 2, wherein (iv) is a hydrophilic silica having a surface area of 50 to 300 $m^2/g$.

10. A composition according to claim 9, wherein the mixture of (I) further comprises up to 20 weight parts of (v) a polyorganosiloxane comprising siloxane units of the general formula $R^8_e(R^9O)_fSiO_{(4-e-f)/2}$ and having a viscosity of 5 to 200 $mm^2/s$ at 25° C. wherein $R^8$ is a monovalent hydrocarbon or halogenated hydrocarbon group having one to ten carbon atoms, $R^9$ is hydrogen or a monovalent hydrocarbon group having one to ten carbon atoms, the value of e is from 1.9 and 2.2, and f has a value so as to provide two or more $—OR^9$ groups in each molecule.

11. A composition according to claim 10, wherein (v) is a hydroxyl-terminated polydimethylsiloxane having a viscosity of about 10 to 100 $mm^2/s$ at 25° C.

12. A composition according to claim 11, wherein
(A) is a trimethylsilyl-terminated polydimethylsiloxane having a viscosity of about 350 to 15,000 $mm^2/s$ at 25° C.,
(B) is a hydroxyl-terminated polydimethylsiloxane having a viscosity of about 1,000 to 50,000 $mm^2/s$ at 25° C.,
  (ii) is ethyl polysilicate or a siloxane resin copolymer comprising $(CH_3)_3SiO_{1/2}$ units and $SiO_2$ units in a molar ratio of approximately 0.4:1 to 1.2, and
  (iii) is potassium hydroxide, sodium hydroxide, potassium silanolate, ammonium carbonate, or ammonium hydroxide.

13. A composition according to claim 12, wherein (II) is a mineral oil having a viscosity from 1 to 20 millipascal-seconds at 25° C.

wherein Me denotes methyl, j has a value of 1 to 250, k has a value of from 1 to 15, l has a value of 1 to 50, m has a value of 1 to 250, n has a value of from greater than 1 to 15, p has a value of 1 to 50, r has a value of 20 to 1000, u has a value of 5 to 50, v has a value of 5 to 50, and $R^{15}$ is hydrogen, methyl, or $C(O)CH_3$.

15. A composition according to claim 14, wherein (IV) is a hydrophobic silica having a surface area of 50 to 300 $m^2/g$.

16. A composition according to claim 15, wherein the composition further comprises (V) a polyglycol.

17. A composition according to claim 1, wherein (A) is a trimethylsilyl-terminated polydimethylsiloxane having a viscosity of about 350 to 15,000 $mm^2/s$ at 25° C., (B) is a hydroxyl-terminated polydimethylsiloxane having a viscosity of about 1,000 to 50,000 $mm^2/s$ at 25° C., (ii) is ethyl polysilicate or a siloxane resin copolymer comprising $(CH_3)_3SiO_{1/2}$ units and $SiO_2$ units in a molar ratio of approximately 0.4:1 to 1.2, and (iii) is potassium hydroxide, sodium hydroxide, potassium silanolate, ammonium carbonate, or ammonium hydroxide.

18. A composition according to claim 17, wherein (II) is a mineral oil having a viscosity from 1 to 20 millipascal-seconds at 25° C.

19. A composition according to claim 18, wherein (III) is a polydiorganosiloxane having the formula

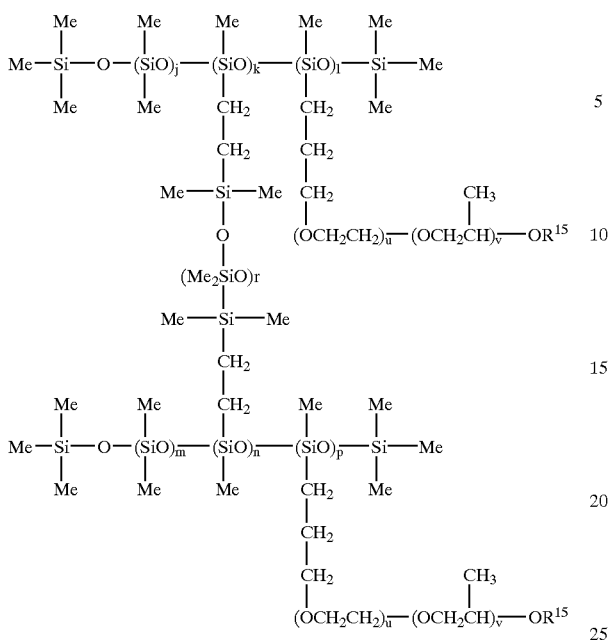

wherein Me denotes methyl, j has a value of 1 to 250, k has a value of from 1 to 15, l has a value of 1 to 50, m has a value of 1 to 250, n has a value of from greater than 1 to 15, p has a value of 1 to 50, r has a value of 20 to 1000, u has a value of 5 to 50, v has a value of 5 to 50, and $R^{15}$ is hydrogen, methyl, or $C(O)CH_3$.

20. A composition according to claim 19, wherein (IV) is a hydrophobic silica having a surface area of 50 to 300 m²/g.

21. A composition according to claim 20, wherein the composition further comprises (V) a polyglycol.

22. A composition according to claim 1, wherein j has a value of 1 to 250, k has a value of from 1 to 15, l has a value of 1 to 50, m has a value of 1 to 250, a has a value of from greater than 1 to 15, p has a value of 1 to 50, r has a value of 20 to 1000, s has a value of 2 to 6, t has a value of 2 to 4, u has a value of 5 to 50, v has a value of 5 to 50, and w has a value 1 to 50.

23. A composition according to claim 1, wherein the composition further comprises (V) a polyglycol.

24. A method for controlling foam producing system comprising adding to the foam producing system of claim 1.

25. A method of making a silicone foam control composition comprising mixing:
(I) a silicone antifoam agent prepared by reacting at a temperature of 50° C. to 300° C. a mixture comprising:
  (i) 100 weight parts of at least one polyorganosiloxane selected from the group consisting of
    (A) a polyorganosiloxane having a viscosity of about 20 to 100,000 mm²/s at 25° C. and being expressed by the general formula $R^1{}_aSiO_{(4-a)/2}$ in which $R^1$ is a monovalent hydrocarbon or halogenated hydrocarbon group having 1 to 10 carbon atoms and a has an average value of 1.9 to 2.2;
    (B) a polyorganosiloxane having a viscosity of 200 to about 100 million mm²/s at 25° C. expressed by the general formula $R^2{}_b(R^3O)_cSiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain; and
    (C) a mixture of (A) and (B);
  (ii) 0.5 to 20 weight parts of at least one silicon compound selected from the group consisting of
    (a) an organosilicon compound of the general formula $R^4{}_dSiX_{4-d}$ in which $R^4$ is a monovalent hydrocarbon group having 1 to 5 carbon atoms, X is a halogen atom or a hydrolyzable group and d has an average value of one or less;
    (b) a partially hydrolyzed condensate of said compound (a);
    (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1; and
    (d) a condensate of said compound (c) with said compound (a) or (b); and
  (iii) a catalytic amount of a compound for promoting the reaction of components (i) and (ii);
(II) at least one mineral oil;
(III) a compound having a viscosity of 100 to 100,000 mm²/s at 25° C. and having the unit formula:

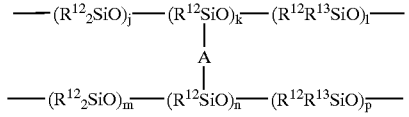

wherein $R^{12}$ is a monovalent hydrocarbon group, A is a group having the formula $(CH_2)_q$—$(R^{14}{}_2SiO)_rSi(Ch_2)_s$ or the formula $O(R^{14}{}_2SiO)_r$—SiO wherein $R^{14}$ denotes a monovalent hydrocarbon group, q has a value of 2 to 10, r has a value of 1 to 5000, s has a value of 2 to 10, $R^{13}$ denotes a group having its formula selected from the group consisting of:

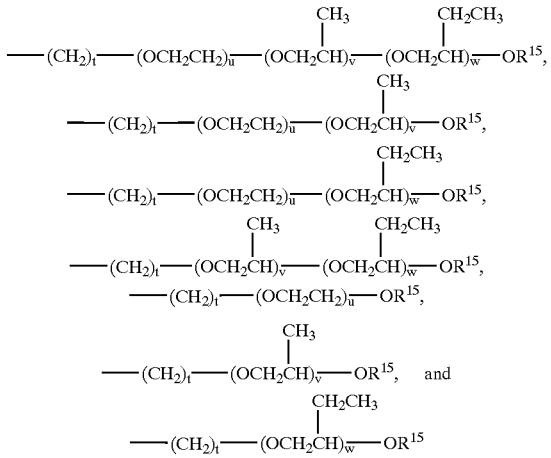

wherein $R^{15}$ is selected from a hydrogen atom, an alkyl group, an aryl group, or an acyl group, t has a value of 2 to 10, u has a value of from greater than zero to 150, v has a value of from greater than zero to 150, and w has a value of from greater than zero to 150, j has a value of 1 to 1000, k has a value of from greater than zero to 30, l has a value of 1 to 1I000, m has a value of 1 to 1000, n has a value of from greater than zero to 30, p has a value of 1 to 1000; and
(IV) at least one finely divided filler.

* * * * *